Patented Jan. 8, 1935

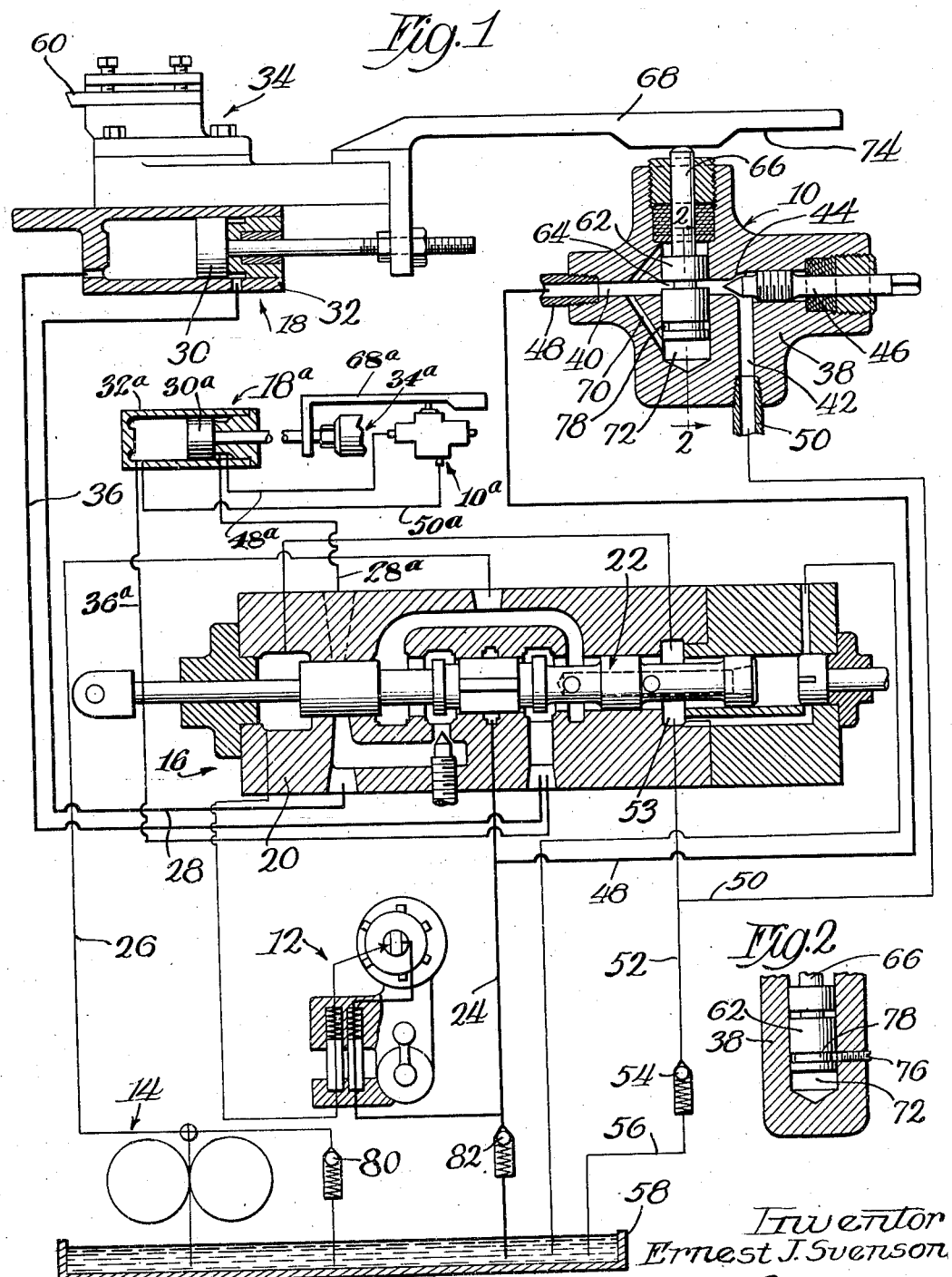

1,986,862

UNITED STATES PATENT OFFICE 1,986,862

FLUID CONTROLLING MEANS

Ernest J. Svenson, Rockford, Ill.

Application November 16, 1929, Serial No. 407,782

29 Claims. (Cl. 60—52)

My present invention relates generally to hydraulic feeding means and more particularly to means for controlling the dispatchment of a fluid medium to fluid operated mechanisms such as mechanisms for actuating machine tools and the like.

Pumps of the multi-plunger type have heretofore been employed for displacing fluid medium to various types of actuating mechanisms such as fluid actuated devices for moving machine tools. One of the problems incident to the operation of such rotary plunger pumps is that of overcoming pulsative effects which result when said pumps are functioning to cause relatively slow feeding movement of a hydraulic actuator. Thus for example, when it is desired to move a tool across the surface of the work at a slow speed in order to make a heavy cut, the rate of displacement of fluid within the hydraulic actuator is obviously less as compared with the displacement within said actuator which takes place when said tool is being moved rapidly across the work. These deleterious, pulsative effects take place during the slow movement of the tool and in many instances seriously impair the cutting action of the tool.

It is one of the primary objects of my present invention to provide improved and effectively operable means of very simple and inexpensive construction for overcoming the above mentioned and other unsatisfactory results which have heretofore been experienced, and to this end I propose to provide improved means whereby a portion of the displaced fluid may be diverted so as to eliminate pulsative effects.

More specifically, my invention contemplates the provision of a bleed passage which will serve to divert a predetermined volume of fluid displaced by a rotary plunger pump in such a manner as to maintain uniform, non-pulsative flow of the fluid into the actuator.

Another object of my present invention is to provide means, as above set forth, for diverting displaced fluid, which is entirely automatic and adapted to be used in a fluid system without the necessity of employing independent means for positively controlling the actuation of the fluid diverting means.

Still another object of my invention is to provide a fluid feeding device having a discharge orifice which may be adjustably controlled in size so as to effect the diversion of a desired volume of displaced fluid in accordance with the operating characteristics of the mechanism or machine with which the fluid feeding means is to be associated.

Still another object of my invention is to provide a fluid feeding means of simple, yet sturdy construction which may be employed independently of any actuating mechanism for diverting a predetermined volume of displaced fluid and which may also be rendered inoperative by simply shifting a valve, which shifting may be accomplished manually or automatically as the occasion may demand.

Still another object is to provide in combination with a fluid system in which fluid is displaced by a multi-plunger pump or the like, a fluid diverting device which includes a restricted orifice or bleed passage and a valve which is operative in response to the movement of a machine element to control the functioning of said bleed passage.

These and numerous other objects and advantages will be more apparent from the following detailed description when considered in connection with the accompanying drawing, wherein:

Figure 1 discloses somewhat diagrammatically an oil or fluid system which illustrates the practical application of my improved means for controlling the displacement of fluid to machine actuating mechanisms; and Figure 2 is a fragmentary sectional view taken substantially along the line 2—2 of Figure 1.

Before considering in detail the specific structure disclosed in the accompanying drawing, it should be understood that a rotary pump of the multi-plunger type will displace fluid at a substantially constant rate for a fixed stroke, that is, for each particular setting of the plungers in said pump. If the pump is being used to displace fluid for propelling a tool across the surface of a rotating work piece and said tool is subjected to substantially constant resistance during its cutting stroke, the setting of the pump may be such as to displace fluid at a rate which is in accordance with the travel of the tool. If, however, the tool is subjected to a variation in resistance, as for example, resistance which is set up when an exceptionally heavy cut is made, it might be necessary to vary the speed of travel of the tool accordingly. Thus, if the speed is cut down, the rate of displacement of the fluid to the tool actuating means is also decreased and the pressure obviously increased. Delivering fluid at increased pressure and decreased displacement causes the pulsative action of the pump plungers to subject the fluid to a deleterious pulsative action unless some compensating means is provided.

The invention about to be described includes control mechanism for automatically controlling the distribution of fluid and this mechanism includes the device designated generally by the numeral 10. In order to clearly illustrate the practical application of the invention I have shown this control or compensating mechanism 10 in operative association with a fluid displacement system which includes a high pressure displacement rotary pump 12, a low pressure gear pump 14, a main control valve 16 and a tool actuating mechanism 18. The specific construction of the main valve 16 does not form a part of the present invention except as it enters into the combination with my improved control mechanism 10 and therefore a detailed description of this valve is not necessary for a comprehensive understanding of the present invention. For a more detailed understanding of the specific construction of this valve, reference is made to my copending application, Serial Number 407,781, filed of even date herewith and which has now issued into Patent No. 1,924,422. In said patent I have disclosed and claimed a system of hydraulic control wherein both high pressure and low pressure pumps are shown in combination with control mechanism. However, the control of an actuator during its forward movement, as disclosed and claimed herein, differentiates from the combination shown and claimed in the aforementioned patent.

It will suffice to say that the main control valve 16 comprises a housing 20 and a main cylindrical valve 22 which is reciprocable within said housing for variously controlling the distribution of high and low pressure fluids. In the particular embodiment of the invention which is disclosed in the drawing, fluid at high pressure is directed from the rotary plunger pump 12 through a pipe line 24 which directs said fluid into association with the main valve. The low pressure gear pump 14 supplies fluid through a pipe line 26 to said main valve. When said valve occupies a predetermined shifted position, fluid is dispatched from said valve through a pipe line 28 to one side of the piston 30 of the actuating mechanism 18, said piston being reciprocable within a suitable cylinder 32. This piston 30 is operatively connected by any suitable means with a tool carriage 34 and fluid pressure against the right side of the piston 30, Figure 1, will cause said piston and carriage to be moved to the left. Fluid on the opposite side of the piston will be returned through a pipe line 36 to said main control valve.

The control mechanism 10 includes a suitable housing 38 which housing is provided with a passage 40 disposed at substantially right angles with respect to a passage 42. Communication between the passage 40 and the passage 42 is established by means of a restricted orifice or bleed passage 44 and the size of this orifice is controlled by means of a suitable needle valve 46. The passage 40 is connected by means of a pipe line 48 to the pipe line 24 as clearly shown in Figure 1 and the passage 42 is connected by means of a pipe line 50 to a pipe line 52. This pipe line 52 is connected to the low pressure side of the fluid circuit and a back pressure valve 54 is interposed between the pipe line 52 and a pipe line 56 which communicates with a reservoir 58. This pipe line 52 also connects with an annular passage 53 provided in the valve housing 20.

For the purpose of understanding the practical application of this control mechanism 10, assume that fluid is being displaced from the high pressure pump 12 at a substantially constant rate and that the main valve 22 is so positioned as to cause said fluid to be delivered to the actuating mechanism 18. Assume further that during the initial stroke of the tool carriage 34, the tool 60 carried thereby during its initial movement, removes practically no metal from the work piece and that as the tool advances, the cutting action of the tool is increased. That is to say, more metal is removed as the tool advances. It will be seen that as a heavier cut is made by the tool, or in other words, as said tool is subjected to greater resistance, there will be a tendency to set up increased pressure in the cylinder 32 of the actuating mechanism. This also tends to increase the velocity of the fluid which is bypassed through the pipe line 48 and hence through the bleeding or restricted orifice 44. By diverting a portion of the displaced fluid in this manner it will be apparent that less fluid per unit of time is dispatched to the cylinder, thereby decreasing the speed of travel of the piston 30 and consequently the tool 60. Thus, by means of the control mechanism 10, a predetermined portion of the volume of fluid displaced by the plunger pump is diverted through the bleed passage and thence through the pipe line 50.

The practical advantage of this simple automatic means for controlling the fluid displaced by a plunger pump or the like will be readily apparent when it is understood that forgings, castings and the like are frequently formed with a certain amount of draft and hence when subjected to a machining operation, an unequal amount of stock must be removed as the tool travels from one end of the work piece to the other. Complicated mechanisms in the form of elements mechanically interposed between the machine and the fluid system have heretofore been employed to vary the speed of travel of the tool carriage, but obviously such a device must be adjusted in accordance with the external contour of the work piece which is to be milled, turned or shaped by the machine. Applicant's improved control means positively precludes the necessity of using any mechanical connections such as cams and the like for controlling the displacement of fluid and in fact merely requires that the bleed passage be adjusted to suit the particular needs incident to the operation of the particular machine with which the control mechanism is to be used.

As set forth above, my improved control mechanism 10 may be placed within any fluid system and will automatically function to divert a predetermined portion of displaced fluid without employing auxiliary operating devices. However, in some instances it may be desirable to temporarily render the control mechanism functionally inoperative during the actuation of a machine tool. In such instances I employ a valve 62 which is reciprocably mounted within the housing 38. This valve 62 is formed with an annular passage 64 which permits fluid introduced from the pipe line 48 to be delivered to the bleed passage 44 when said valve occupies the position shown in Figure 1. The upper portion of the valve 62 is formed with a shank 66 and slidable along the upper extremity of this shank is a cam bar 68 in the particular disclosure which is carried by the tool carriage 34. Fluid introduced within the passage 40 is bypassed through a restricted passage 70 which communicates at its lower extremity with a chamber 72 at the lower end of the valve 62. The pressure of the fluid within the chamber 72 is sufficient to constantly urge said valve upwardly into engagement with the surface of the cam bar 68 as shown in Figure 1. As the cam bar moves to the left in response to the movement of the carriage mechanism 34, a depressed portion 74 of the cam permits the valve 62 to be urged upwardly a sufficient distance so as to prevent the diversion of fluid through the restricted or bleed passage 44. The arrangement of the valve and cam mechanism just described is applicable in instances where it is desirable to reduce the speed of travel of the tool for a certain portion of its stroke and then to increase the speed of travel thereof. In the drawing I have shown a very simple arrangement for the purpose of disclosing one practical application of the cut-off valve 62, but it should be understood that my invention is capable of application in many other instances where it is desirable to variously control the cut-off valve. Attention is directed to the fact that the valve 62 may be secured in a fixed position by means of a set screw 76 shown in Figure 2 which is adapted to be received by an annular groove 78 provided in the body of the valve. In other words, in instances where the mechanical control of the valve 62 is not required and it is only necessary to maintain constant communication between the passages 40 and 42, the set screw 76 serves to maintain this communication by securing the valve in the position shown in Figure 1.

It will also be noted that a fluid controlling device, which I have designated generally by the numeral 10a and which corresponds with the device 10 already described, may be connected with a second actuator 18a through the medium of pipe lines 48a and 50a. This actuator 18a includes a piston 30a, which is reciprocable within a cylinder 32a, said cylinder being connected with the main valve 16 through the agency of pipe lines 28a and 36a. This actuator 18a serves as means for propelling a suitable machine element or tool support 34a, and a cam bar 68a, which corresponds to the bar 68 already described, may be mounted upon the piston rod of the actuator 18a for controlling the functioning of the control device 10a. Referring to Figure 15 in my above mentioned copending application, it will be seen that this actuator 18a and its associated parts are disclosed in more detail. It will be apparent that by employing the control device 10a, I am able to control at predetermined intervals the speed of travel of the actuator piston 30a in a manner similar to that described in connection with the control of the speed of the piston 30 by means of the control device 10.

My invention contemplates the use of the described control or compensating devices in machines having a plurality of fluid actuated mechanisms. In such instances, each control mechanism may be adjusted to suit the nature of the work which the machine tool is called upon to perform. It will be apparent that my invention is not limited for use in connection with any particular type of machine but is adapted for use in any fluid system wherein it is desirable to divert a certain portion of displaced fluid as and for the purpose set forth above. As already pointed out, the described control mechanism automatically operates to reduce the speed of a fluid actuated mechanism which is supplied with fluid from a rotary plunger pump or other similar pumping device. While the speed of travel of the machine tool is retarded, the displacement of the pumping mechanism remains constant. In other words, while the displacement of the pumping mechanism remains constant, the amount of this displaced fluid which is delivered to the actuating mechanism is reduced by reason of the diversion of fluid which takes place through the bleed passage. In this manner I am not only able to very efficiently, automatically and positively control the speed of travel of the machine tool as said tool is subjected to a variation in resistance, but I am also able to eliminate deleterious, pulsative effects in the fluid medium which have heretofore been experienced when the speed of travel of the actuating mechanism has been reduced. Devices such as machine tools must be subjected to considerable variation in speeds and my present invention is particularly adaptable in such instances. In other words, my invention enables the use of a single variable displacement pumping mechanism as distinguished from arrangements which have heretofore been employed in which a pump of one size is used for certain purposes and a pump of another size for other purposes, both pumps being employed for the same machine. The reason for using pumps of different sizes will be apparent when it is understood that under certain operating conditions an unusually slow speed of travel of the machine tool is required and hence the rate of delivery of fluid thereto must be decreased, while under other operating conditions a very high rate of speed of travel of the machine tool is required which necessitates increased rate of fluid delivery. Both of these conditions apply to the same machine and hence it will be apparent that heretofore it has been necessary to utilize pumps of different sizes. My present invention, however, enables a machine to be equipped with a single pumping mechanism by reason of the fact that a compensating effect is automatically superimposed upon the fluid circuit to eliminate the above mentioned pulsative action within said fluid.

While the above described control mechanism is adapted to maintain the desired uniform displacement during the subjection of the cutting tool to resistances or loads which vary over a predetermined range, it should be noted that I provide a valve 54 which operates to permit a suitable back pressure to be built up in the various cylinders of the fluid actuated mechanisms so as to overcome a pulsative action in starting. Valves 80 and 82 are provided for protecting the mechanism against being subjected to excessive pressures, the valve 80 being utilized as a safety means for the gear pump 14 and valve 82 as a relieving or safety device for the high pressure plunger pump 12.

For a further and more detailed description of the valve mechanism 16, reference is made to my Patent No. 1,924,422. Attention is also directed to the fact that the circuit in the present application is particularly adapted for controlling the diversion of fluid during the forward movement of the actuator 18. My copending application Serial No. 391,130, filed September 9, 1929, for Material working apparatus, covers the broad idea of controlling fluid diversion during either forward or reverse movement of the actuator, and also covers a system wherein the speed of the actuator is controlled during the reversal thereof, as distinguished from the forward movement shown in the present application.

From the foregoing description it will be apparent that my invention contemplates a hydraulic system of control wherein the pressure of the propelling fluid in the actuator, namely, the fluid within the cylinder 32 which propels the piston 30, is maintained. In other words, even though the actuator be subjected to variations in load, the propelling effectiveness of the fluid in the actuator is not impaired. This system of control should be clearly distinguished from systems commonly referred to as "by-pass" systems, wherein a restricted orifice interposed between the source of supply or pump and the actuator is brought into play for the purpose of decreasing the rate at which the fluid is delivered to the actuator. The excess fluid under such circumstances is returned through resilient valve means at a pressure which is greater than the pressure of the propelling fluid in the actuator. In such systems of control, the effective propelling pressure of the propelling fluid in the actuator is decreased when the restricted orifice is rendered functionally operative. Hence, some compensating arrangement is required to render such systems satisfactory. By-pass systems of control have been commonly employed in grinding machines and the like wherein the propelled load is very light and of a substantially constant nature.

To more clearly set forth the distinction of my invention over the prior patented art and commercial systems, with which I am familiar, I wish to make a résumé of the functional characteristics of the previously described structure. I aim to maintain a preselected speed of the actuator by maintaining a propelling pressure which is substantially constant in the actuator. This pressure may be slightly increased due to increase in resistance experienced by said actuator as a result of the increase in load propelled, and due to variation in the differential fluid pressure between the intake and the return side of the actuator. It is a known fact that propelling fluid, such as mineral oil and the like, varies in viscosity due to heat. This requires some compensating means when the propelling fluid is controlled by passing through small orifices or valves for setting up what is known as a compensating resistance to govern the amount of fluid to an actuator, and consequently the speed of such an actuator.

It will be seen that, in my system, the fluid, without any restriction, is dispatched directly to the intake or propelling side of the actuator, and that the return fluid is dispatched through resilient means 54 back to the reservoir 58. Also, the control mechanism for causing a diversion of fluid is so arranged as not to interfere with the maintenance of the propelling pressure in the actuator, but serves merely to decrease the rate of fluid delivery to the actuator by diverting fluid through a conduit connected with the conduit leading from the pumping means to the propelling end of the actuator in a manner so as to dispatch or divert a governed amount of fluid at a given pressure, and to increase the pressure of the propelling fluid when the actuator experiences an increase in load, which, of course, slightly decreases the speed of the actuator. The differential pressure, that is, the difference in pressures in opposite ends of the actuator, available as a propelling medium is constantly maintained. Thus, if a slight decrease in fluid pressure occurs, as, for example, a change resulting from a change in viscosity of the propelling fluid in the forward end, said change also automatically takes place in the return end, hence the aforesaid differential pressure is maintained substantially constant. This arrangement must be clearly distinguished from the aforesaid common by-pass systems, in which the propelling pressure in the actuator decreases when a change in the viscosity of the fluid takes place, increasing the speed through a restricted orifice or valve without producing any compensating effect in the return side thereof.

I also wish to bring out that by having two pumping means, I can arrange the displacement of one of said pumping means to be relatively small, whereby the presence of heat caused by the diversion of fluid is decreased to a minimum, and whereby valve means are incorporated to allow the other pumping means which I select to displace a large amount of fluid in order to obtain an intermediate, fast action to the actuator, and which I arrange to circulate during the employment of the first mentioned pumping means at a relatively low pressure.

Throughout the specification and in many of the claims reference is made to mechanism or device for diverting fluid, etc., and it should be understood that these descriptive terms are used in their broadest sense. That is to say, applicant's invention is not limited to any specific fluid diverting means and control means therefor, but contemplates modifications and variations whereby diversion of fluid takes place in such a manner as to insure the maintenance of the pressure of the propelling fluid in the actuator, as distinguished from common by-pass systems referred to above wherein the pressure within the propelling side of the actuator cannot be maintained. The invention contemplates systems of the general class or type described in this specification, wherein the pressure at the discharge side of the pump is substantially the same as the pressure within the actuator, even though fluid is passed through a restricted orifice during a predetermined interval in the cycle of operation of the actuator. Furthermore, my invention contemplates such systems of hydraulic control wherein the propelling pressure in the actuator is not only maintained, but automatic compensation in the pressures on opposite sides of the actuator takes place in a manner to maintain a substantially constant pressure differential.

Having thus described my invention, what I claim as new and desire to secure by Letters Patent is:

1. In combination with a fluid transmission system including pumping means for displacing fluid, a propelling mechanism and a main fluid control valve operatively connected therewith for controlling the starting and reversing of said propelling mechanism, control mechanism operable independently of said main valve and having an orifice for diverting a predetermined portion of the displaced fluid in response to an increase in resistance experienced by the propelling mechanism during at least the forward movement thereof without impairing the propelling power of said propelling mechanism.

2. In combination with a fluid transmission system including pumping means for displacing fluid, a propelling mechanism and a main fluid control valve operatively connected therewith for controlling the starting and reversing of said propelling mechanism, control mechanism operable independently of said main valve for diverting a portion of the displaced fluid when the load varies during at least the forward movement of said propelling mechanism without reducing the pressure of the propelling fluid in the propelling mechanism.

3. In combination with a fluid transmission system including pumping means for displacing fluid, a propelling mechanism and a main fluid control valve operatively connected therewith for controlling the starting and reversing of said propelling mechanism, control mechanism operable independently of said main valve and having a bleed passage for automatically controlling the diversion of displaced fluid in accordance with the resistance experienced by the propelling mechanism without decreasing the pressure of the propelling fluid in said propelling mechanism.

4. In combination with a fluid transmission system including pumping means for displacing fluid, a propelling mechanism and a main fluid control valve operatively connected therewith for controlling the starting and reversing of said propelling mechanism, control mechanism operable independently of said main valve and having a bleed passage for automatically controlling the diversion of displaced fluid in accordance with the resistance experienced by the propelling mechanism without decreasing the pressure of the propelling fluid in said propelling mechanism, and means for controlling the amount of fluid diverted through said bleed passage.

5. In combination with a fluid transmission system including pumping means for displacing fluid, a propelling mechanism and a main fluid control valve operatively connected therewith for controlling the starting and reversing of said propelling mechanism, control mechanism for diverting a portion of the displaced fluid when the load varies without reducing the pressure of the propelling fluid in said propelling mechanism, and means operable independently of said main valve for rendering the control mechanism functionally inoperative.

6. In combination with a fluid transmission system including pumping means for displacing fluid, a propelling mechanism and a main fluid control valve operatively connected therewith for controlling the delivery of said fluid to said propelling mechanism, control mechanism for diverting a portion of the displaced fluid during at least the forward movement of said propelling mechanism without reducing the pressure of the propelling fluid in said propelling mechanism, and a valve means for controlling the passage of fluid through said control mechanism.

7. In combination with a fluid transmission system including pumping means for displacing fluid, a propelling mechanism and a main fluid control valve operatively connected therewith for controlling the starting and reversing of said propelling mechanism, control mechanism including a housing having a passage for diverting fluid displaced by said pumping means which includes a restricted orifice for controlling the diversion of said fluid, and means for controlling the flow of fluid through said restricted orifice.

8. In combination with a fluid transmission system including pumping means for displacing fluid, a propelling mechanism and a main fluid control valve operatively connected therewith for controlling the starting and reversing of said propelling mechanism, control mechanism operable independently of said valve and including a housing having a passage for diverting fluid displaced by said pumping means and having an adjustable restricted orifice for controlling the diversion of said fluid, and means for controlling the flow of fluid through said restricted orifice.

9. In combination with a fluid transmission system including pumping means for displacing fluid, a main reversing valve operatively connected therewith and a fluid actuated mechanism operatively connected with said valve, fluid control mechanism including means for diverting a portion of the fluid displaced by said pumping means at a presssure experienced in said fluid actuated mechanism, and means operable in response to the actuation of said fluid actuated mechanism during at least the forward movement thereof for controlling the passage of fluid through said diverting means.

10. In combination with a fluid transmission system including pumping means for displacing fluid, a main reversing valve mechanism operatively connected with said pumping means and a fluid actuated mechanism operatively connected with said valve, fluid control mechanism for diverting a portion of the fluid displaced by said pumping means without reducing the propelling effectiveness of the propelling fluid upon said fluid actuated mechanism, and valve mechanism operable in response to the actuation of said fluid actuated means during at least the forward movement thereof for controlling the passage of fluid through said fluid control device.

11. In combination with a fluid transmission system including pumping means for displacing fluid, a main reversing valve mechanism operatively connected therewith and a fluid actuated mechanism operatively connected with said valve, a control device having a restricted orifice through which a portion of the fluid displaced by said pumping means may be diverted at a pressure experienced in said fluid actuated mechanism, and a valve mechanism operable in response to the actuation of said fluid actuated mechanism during at least the forward movement thereof for controlling the operative functioning of said restricted orifice.

12. In combination with a fluid transmission system including pumping means for displacing fluid, a main fluid dispatching valve, a passageway connecting said fluid dispatching valve and said pumping means, a fluid actuated mechanism operatively connected with said valve, said mechanism including a piston within a cylinder, and fluid control mechanism including a device for diverting a portion of the fluid displaced by said pumping means during at least the forward movement of said fluid actuated mechanism without reducing the propelling power of fluid in said fluid actuated mechanism, said device being connected at a point intermediate the pumping means and the valve, said valve being shiftable for starting and reversing said fluid actuated mechanism.

13. In combination with fluid actuated mechanisms for propelling machine elements and the like and means for supplying fluid to said mechanisms, a bleed valve mechanism for diverting a predetermined portion of the fluid directed to the fluid actuated mechanisms in response to an increase in resistance experienced by the elements propelled by said mechanism, and valve means operable in timed relation with the travel of said fluid actuated mechanisms for controlling the starting, stopping, and direction of movement thereof.

14. In combination with a machine tool having fluid actuated mechanisms for actuating various parts thereof, an adjustable bleed valve hydraulically coupled with each mechanism for diverting fluid which is directed to each of said fluid actuated mechanisms in response to an increase in load experienced thereby, a main valve mechanism for controlling the delivery of fluid to said mechanisms from a source of supply, and means for controlling the functioning of said bleed valves in timed relation with the travel of said fluid actuated mechanisms.

15. In combination with a fluid circuit having a high pressure pump, means for controlling the fluid displaced by said pump, said means including a restricted orifice through which a governed amount of fluid may be diverted from the portion of the fluid circuit connected with the discharge side of said high pressure pump without decreasing the pressure of the propelling fluid discharged by said pump, a hydraulic actuator including a piston within a cylinder, and valve mechanism for controlling the starting and reversal of said actuator, said fluid diverting means being adapted to function during the forward movement of said actuator at a pressure experienced in said hydraulic actuator.

16. In combination with a fluid circuit having a high pressure pump, means for controlling the fluid displaced by said pump, said means including an orifice through which a governed amount of fluid may be diverted from the portion of the fluid circuit connected with the discharge side of said pump without decreasing pressure of the propelling fluid displaced by said pump, means for controlling the functioning of said fluid diverting means, a hydraulic actuator, and a valve operable independently of said controlling means for governing the starting and reversal of said actuator, said fluid diverting means being adapted to function during the forward movement of said actuator at the propelling pressure experienced in said hydraulic actuator.

17. In combination with a fluid transmission system having a source of fluid supply, a fluid actuated propelling mechanism, and means for directing said fluid to said fluid actuated propelling mechanism, a fluid compensating means including a bleed passage, said compensating means being interposed between the source of fluid supply and the fluid actuated mechanism so as to effect the diversion of a governed amount of fluid in response to the load upon the fluid actuated mechanism without decreasing pressure of the propelling fluid in said fluid actuated mechanism, and a valve operable independently of each fluid compensating means and in timed relation with said propelling mechanism for controlling the starting and reversal of said fluid propelling mechanism.

18. In a hydraulic actuator system, a shiftable supporting machine element, a hydraulic actuator for propelling said element including a piston within a cylinder, a variable displacement pump, means connecting said displacement pump with said hydraulic actuator, fluid diverting means interposed between said variable displacement pump and said actuator, said fluid diverting means being operable during the forward movement of said actuator, whereby a predetermined amount of fluid may be diverted so as to prevent pulsative effects within the system when the machine element is subjected to an increase in load, said fluid diversion occurring without reducing the propelling effectiveness of the fluid, and means operable independently of said fluid diverting means for controlling the starting and reversal of movement of said hydraulic actuator.

19. In a hydraulic actuator system, a shiftable supporting machine element, a hydraulic actuator movable in forward and reverse directions for propelling said element including a piston within a cylinder, pumping means, fluid conducting means connecting said pumping means with said actuator, fluid diverting means associated with said conducting means for diverting fluid therefrom at the propelling pressure experienced in said actuator when the machine element is subjected to increase in load during its movement in a forward direction, and means for controlling the functioning of said fluid diverting means in timed relation with respect to the forward shifting of said machine element.

20. In a hydraulic actuator system, a shiftable supporting machine element, a hydraulic actuator movable in forward and reverse directions for propelling said element including a piston within a cylinder, fluid conducting means connected with said actuator, fluid diverting means associated with said conducting means for diverting fluid therefrom at the propelling pressure experienced in said actuator when the machine element is subjected to increase in load during the forward movement of said actuator, pumping means for supplying fluid, means for controlling the functioning of said fluid diverting means in timed relation with respect to the shifting of said machine element, and a control valve mechanism capable of being shifted to at least three positions, namely, forward, reverse, and neutral, for controlling said hydraulic actuator.

21. In a hydraulic actuator system, a shiftable machine element, a hydraulic actuator movable in forward and reverse directions for propelling said element including a piston within a cylinder, fluid conducting means connected with said actuator, fluid diverting means associated with said conducting means for diverting fluid therefrom when the machine element is subjected to increase in load during the forward movement of said actuator, pumping means for supplying fluid, means for controlling the functioning of said fluid diverting means in timed relation with respect to the shifting of said machine element, and a control valve mechanism capable of being shifted to at least three positions, namely, forward, reverse, and neutral, for controlling said hydraulic actuator, said control valve mechanism in its neutral position being adapted to circulate fluid in the system and thereby render the pump functionally inoperative for propelling purposes.

22. In a hydraulic actuator system, a shiftable machine element, a hydraulic actuator movable in forward and reverse directions for propelling said element including a piston within a cylinder, fluid conducting means connected with said actuator, fluid diverting means associated with said conducting means for diverting fluid therefrom at the propelling pressure experienced in said actuator when the machine element is subjected to increase in load during the forward movement of said actuator without impairing the propelling effectiveness of the propelling fluid in said actuator, pumping means for supplying fluid, means adapted to be automatically engaged by the structure of said shiftable machine element for controlling the operative functioning of said fluid diverting means, and valve means for controlling the direction of movement of said hydraulic actuator.

23. In a hydraulic actuator system, a shiftable machine element, a hydraulic actuator for propelling said element including a piston within a cylinder, fluid conducting means connected with said actuator, fluid diverting means associated with said conducting means for diverting fluid therefrom when the machine element is subjected to increase in load, pumping means for supplying fluid, valve means for controlling the direction of movement of said shiftable machine element, and hydraulically shiftable means for controlling the functioning of said fluid diverting means in timed relation with respect to the shifting of said machine element.

24. In combination with a fluid transmission system including pumping means for displacing fluid, a fluid dispatching valve operatively connected therewith and a fluid actuated mechanism operatively connected with said valve, a fluid control device for diverting a portion of the fluid displaced by said pumping means, means operable in response to the actuation of said fluid actuated mechanism for controlling the passage of fluid through said fluid control device, and a second pumping mechanism for delivering fluid to said actuator, said valve being constructed and arranged whereby fluid from only one of the pumps is employed for propelling purposes when said control mechanism is functionally operable.

25. In combination with a machine tool having fluid actuated mechanisms for actuating various parts thereof, an adjustable valve hydraulically coupled with each mechanism for diverting fluid which is directed to each of said fluid actuated mechanisms in response to an increase in load experienced thereby, a main valve mechanism for controlling the delivery of fluid to said mechanisms from a source of supply, and means for controlling the functioning of said adjustable valve in timed relation with the travel of said fluid actuated mechanisms.

26. In a hydraulic actuator system, a shiftable machine element, a hydraulic actuator movable in forward and reverse directions for propelling said element and including a piston within a cylinder, fluid conducting means connected with said actuator, fluid diverting means associated with said conducting means for diverting fluid therefrom at the propelling pressure of the propelling fluid in said actuator when the machine element is subjected to increase in load during the forward movement of said actuator, pumping means for supplying fluid, means for controlling the functioning of said fluid diverting means in timed relation with respect to the shifting of said machine element, and a control valve mechanism capable of being shifted to at least three positions, namely, forward, reverse, and neutral, for controlling said hydraulic actuator.

27. In a hydraulic actuator system, a plurality of shiftable supporting machine elements, a hydraulic actuator coupled with each element for moving said element in forward and reverse directions, each of said actuators including a piston within a cylinder, fluid conducting means connected with said actuators, fluid diverting means associated with said fluid conducting means for diverting fluid therefrom at the propelling pressure experienced in said actuators when the machine elements are subjected to increase in load during the forward movement thereof without impairing the propelling effectiveness of the propelling fluid in said actuators, pumping means for supplying fluid, means adapted to be automatically engaged by the structure of at least one of said shiftable machine elements for controlling the operative functioning of said fluid diverting means, and valve means for controlling the direction and movement of said actuators.

28. In a hydraulic actuator system, a plurality of shiftable supporting machine elements, a hydraulic actuator connected with each of said elements, each of said actuators including a cylinder and piston construction, fluid conducting means connected with said actuators, fluid diverting means associated with said fluid conducting means for diverting fluid therefrom when the machine elements are subjected to increase in load, pumping means for supplying fluid, valve means for controlling the direction of movement of said actuators, and hydraulically shiftable means for controlling the functioning of said fluid diverting means in timed relation with respect to the shifting of at least one of said machine elements.

29. In combination with a fluid transmission system including pumping means for displacing fluid, fluid dispatching valve means operatively connected therewith and a plurality of fluid actuated mechanisms operatively connected with said valve means, fluid control means for diverting a portion of the fluid displaced by said pumping means, means operable in response to the actuation of at least one of said fluid actuated mechanisms for controlling the passage of fluid through said fluid control means without impairing the propelling effectiveness of the propelling fluid in said actuators, and a second pumping mechanism for delivering fluid to said actuators, said valve means being constructed and arranged whereby fluid from only one of the pumps is employed for propelling purposes when said fluid control means is functionally operable.

ERNEST J. SVENSON.